United States Patent [19]

Amberg

[11] 4,108,347

[45] Aug. 22, 1978

[54] ONE PIECE FOAM CUP

[75] Inventor: Stephen W. Amberg, Toledo, Ohio

[73] Assignee: Owens-Illinois, Inc., Toledo, Ohio

[21] Appl. No.: 771,150

[22] Filed: Feb. 23, 1977

[51] Int. Cl.² .................... B65D 21/02; B65D 3/10
[52] U.S. Cl. ............................................ 229/1.5 B
[58] Field of Search .......................... 229/1.5 B, 3.5; 206/520

[56] References Cited

U.S. PATENT DOCUMENTS

| | | | |
|---|---|---|---|
| 2,431,537 | 11/1947 | Bogoslowsky | 229/1.5 B UX |
| 3,505,310 | 3/1970 | Goetz | 229/1.5 B X |
| 3,531,555 | 9/1970 | Tiffin et al. | 229/1.5 B X |
| 3,589,592 | 6/1971 | Tigner | 229/1.5 B X |
| 3,931,380 | 1/1976 | Belivakici et al. | 229/1.5 B X |
| 3,970,492 | 7/1976 | Amberg | 156/85 |
| 3,971,471 | 7/1976 | Ludder | 229/1.5 B X |
| 3,995,740 | 12/1976 | Amberg et al. | 206/520 |

*Primary Examiner*—Davis T. Moorhead
*Attorney, Agent, or Firm*—David R. Birchall; Myron E. Click; David H. Wilson

[57] ABSTRACT

A container manufactured from a single piece of foamed plastic sheet material. A simplified process for producing a one-piece container from foamed sheet material. The process including the creation of a container blank from sheet stock, forming a cylinder and through controlled heat shrinking, forming a cup blank that is pressed to final configuration.

4 Claims, 9 Drawing Figures

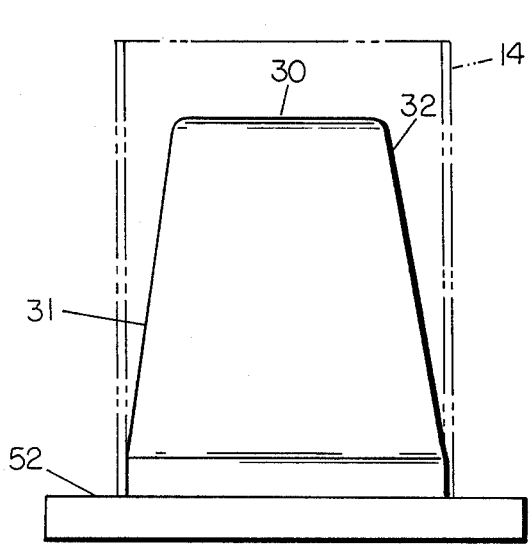
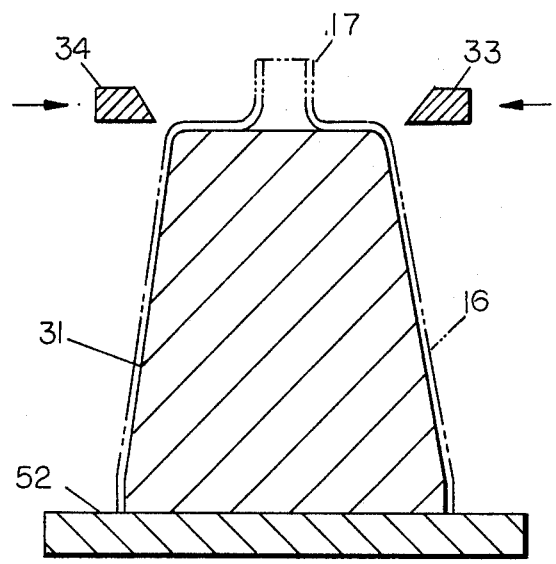
FIG. 6    FIG. 7
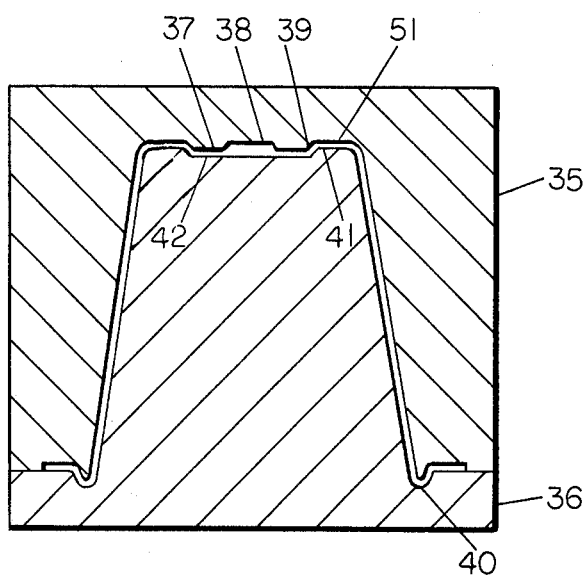
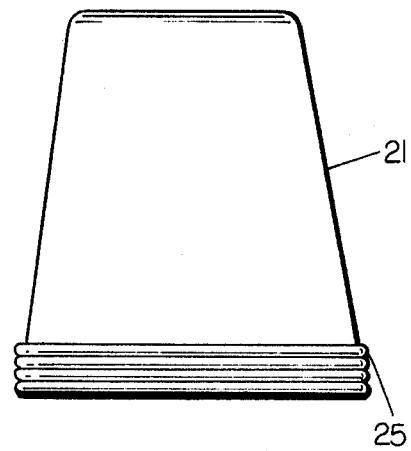
FIG. 8    FIG. 9

ONE PIECE FOAM CUP

This invention relates to a container and the method of manufacture from sheet material. More specifically the invention relates to a container such as a drinking cup. The drinking cup is disposable in nature and is manufactured from lightweight foam sheet stock. The container is made by cutting a flat blank from sheet stock. The blank is formed into a cylinder that is heat shrunk to near final configuration.

The nearly completed cup is then subjected to a pressing step to produce a finished article.

In the manufacture of containers, including cups, it has become advantageous to utilize foam sheet material. The foamed sheet material not only is light in weight but also has thermal insulating qualities that are desirable. For example, the foam material provides a fair measure of insulation against the burning of the hand when hot drinks are transported from place to place. Then too, it is beneficial to utilize foam material in cups for cold beverages because condensation forms less readily on the exterior of a well insulated container.

Heretofore containers have been manufactured from foam plastic material by specific molding of the container such as the well known steam chested compression molding process. Also, curvilinear container blanks have been cut from sheet material. The curvilinear sheet stock was then formed into frusto-conical container bodies to which a bottom was then attached. Both of the above described foam material containers have undesirable characteristics. The steam chested container can only be decorated on its exterior by utilizing pre-printed labels or printing the exterior of a body of revolution. The sheet stock cut to form a frustoconical container produces a considerable amount of waste since each blank must be spaced from the other in the flat pattern.

The advantages of the present invention become readily apparent because the blanks that are cut from the foam sheet material are rectangular in configuration. Thus, there is little and in some instances no waste material from the production of rectangular container blanks. The utilization of flat sheet stock permits decorations to be printed by high speed techniques instead of decorating each cup after its basic geometry has been established.

The present invention utilizes a foam sheet material such as polystyrene or polyethylene or the like. The sheet material is preferably made by the foam extrusion technique. The foam sheet is subjected to orientation in one or both directions. The orientation in the foam sheet permits controlled shaping of the container during its manufacture.

THE DRAWINGS

FIG. 6 is an elevational view that shows a mandrel with a cylindrical sleeve positioned thereon.

FIG. 7 is an elevational view that shows the mandrel with a container shell formed on it.

FIG. 8 is a sectional view through matched dies used to form the container to final configuration.

FIG. 9 is a side view of a stack of nested containers.

THE PREFERRED EMBODIMENT

Figure 1:
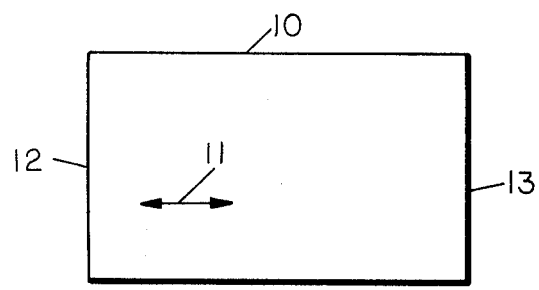
FIG. 1 is a plan view of the rectangular container blank.

A container blank is shown generally at 10 in FIG. 1. Blank 10 has been cut so that it is in the form of a rectangle. While a rectangular configuration is highly desirable, blank 10 could also be square and still conform to the advantages attained by the present invention. Blank 10 has been removed from a larger piece of foam sheet stock by conventional cutting techniques. The blank 10 has been cut so that the maximum orientation of the sheet stock coincides with the long direction of blank 10. Ends 12 and 13 represent the short sides of blank 10. It is possible to have sheet stock wherein there is some degree of orientation perpendicular to the direction of maximum orientation. The amount of orientation perpendicular to the longest length of the blank 10 should preferably be near zero. Although blank 10 does not show any decoration in the drawing, it can readily be visualized how the blank 10 can be decorated while in the flat.

Figure 2:
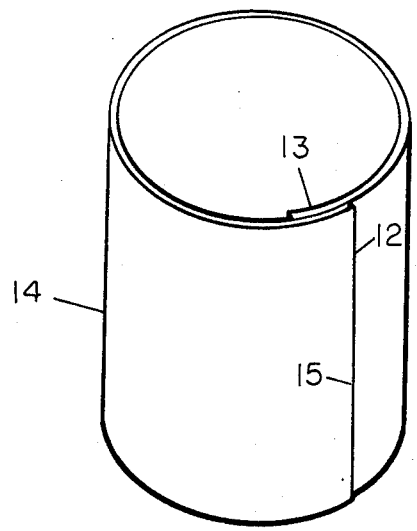
FIG. 2 is a perspective view of a cylindrical container blank.

FIG. 2 shows a cylinder 14 that has been constructed from the blank 10. The circumferential direction of the cylinder 14 is formed from the longest extent of blank 10. Ends 12 and 13 of blank 10 are positioned in overlapped position as shown at 15 on cylinder 14. The ends 12 and 13 may be adhered one to the other by applying an adhesive layer to one or both ends. Also the ends 12 and 13 can be coupled together by heat softening the surfaces of the adjacent ends and then pressing them together. Heat may be applied by any conventional form such as radiant energy, heated platen, or hot fluids such as for example air. The overlap of the ends can be held to a minimum of 4 or 5 times the material thickness, however, best results are attained if the overlap of ends 12 and 13 is in the range of 15–20 times the thickness of the sheet material.

Figure 3:
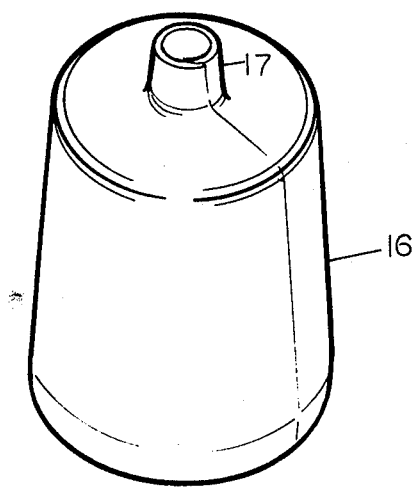
FIG. 3 is a perspective view of a container blank after it has been heat shrunk.

FIG. 3 represents a preformed container shell 16. The cylindrical shell 14 is placed over a mandrel that has an exterior contour nearly like the interior of the finished container. The mandrel is generally frusto-conical in configuration and conveniently made of metal although other materials would equally work as well. After cylindrical shell 14 is positioned over the mandrel, the entire assembly is subjected to a hot fluid bath. While the fluid bath could be liquid, air is the preferred heat exchange medium. The mandrel and sleeve 14 remain under the influence of the hot fluid bath for a predetermined length of time. Depending upon the physical nature of the foam sheet stock being employed, the time within the fluid bath can vary from 1 to 15 seconds. As soon as the foam material reaches a critical temperature, for example 130° C for polystyrene, the individual cells within the foam structure begin to return to their original sphericallike form. Consequently, the foam material shrinks in the direction of original deformation or orientation. Since the foam sheet stock was oriented predominently along the length of the rectangular blank 10, shrinkage is also in the same direction. Cylindrical sleeve 14 shrinks in a circumferential direction in those areas not restrained by the mandrel. A portion of sleeve 14 protrudes above the mandrel and is not restrained by the mandrel as heat is applied to sleeve 14. The neck 17 on shell 16 results because there is no restraint by the mandrel during the heat cycle. The overall thickness of neck 17 and adjacent areas including a portion of the frusto-conical sidewall of shell 16 are thicker than the original foam sheet material.

Figure 4:
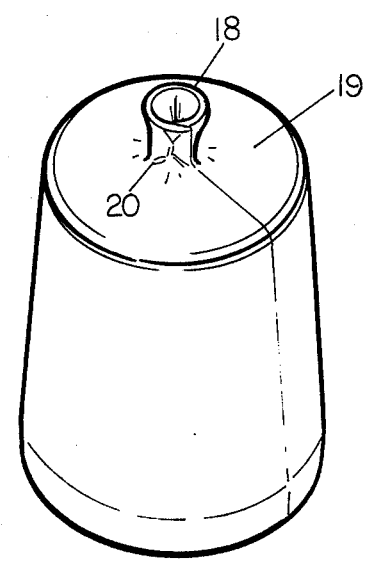
FIG. 4 is a perspective view of a container blank after the bottom opening has been closed.

FIG. 4 shows the frusto-conical shell 16 after the neck 17 has been crimped or adhered together adjacent to bottom 19. The neck 17 can be closed together by the lateral movement of work tools or can be passed through spaced apart roller wheels. The tools can be heated, thus work softening the plastic material or else the crimping action can immediately follow the shrink cycle heretofore described in conjunction with FIG. 3. The crimping action develops a thin line 20 of material between the moil 18 and the container base 19. A slight lateral force completely disengages the moil 18 from the container base 19. The moil 18 is best removed after the plastic material has reached ambient temperature. After moil 18 has been removed from the container base 19, there remains some material that protrudes from the planar container base 19. It is possible to subsequently flatten the protruding material, however, from an appearance standpoint it is not desirable since foam material that is compressed too much has a tendency to become less opaque and becomes more translucent. If the remainder of the moil is flattened, the central portion of the completed container will appear to have a hole in it or else the translucent area will be mistaken for contamination such as with oil or grease.

Figure 5:
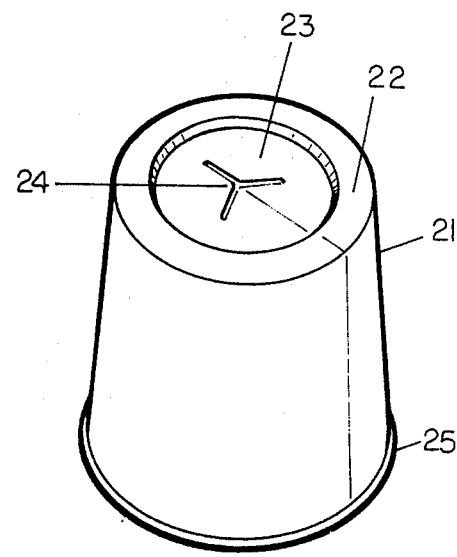
FIG. 5 is a perspective view of a container after the moil has been removed and the rim has been rolled.

FIG. 5 shows a completed cup 21. Cup 21 has a ring-like resting platform or base area 22 and a rolled or crimped rim 25. In addition to the base area 22 the central bottom portion of the cup contains a centrally located depressed planar area 23. The areas 22 and 23 are generally concentrically positioned with respect to one another. The center of the depressed area 23 contains the shear history 24 of that portion where moil 18 was once attached. As heretofore mentioned it is desirable to permit the shear history 24 to protrude from the cup bottom, thus preventing the objectional optical spot in the center of the cup or container. The depressed area 23 and rim 25 are formed by placing shell 16 into a set of matched dies. The placement of the shell 16 into the dies also has an added advantage in that the sidewall of the container can be made uniform in thickness from top to bottom. The thickness of the shell 16 sidewall is thicker adjacent the bottom than it is near the top or rim 25. The extra thickness of the sidewall prevents the finished containers 21 from nesting together rim to rim. After the sidewall has been reduced to a uniform thickness by means of the matched dies, the containers 21 exhibit close rim to rim nesting. The rim to rim nesting feature permits more containers to be shipped per unit volume.

In carrying out the method of the present invention reference may be had to FIG. 6 wherein a holding mandrel 30 is shown. The mandrel 30 has a frusto-conical top section 31 that has an external surface 32. The external surface 32 defines quite closely the interior geometry of the container. The conical section 31 is mounted on a base support plate 52 by any conventional mounting means (not shown). The base plate 52 can of course be part of an articulated conveyor system if desired. A cylindrical blank 14 is shown in dotted lines to represent the interaction between the mandrel 30 and the cylindrical blank 14.

FIG. 7 shows the shrunken shell 16 as it appears on the mandrel 30. Note that neck 17 has been reduced to a minimum diameter, however, the opening therein is not closed. To facilitate a complete closing of the bottom, movable jaws 33 and 34 are positioned radially from the outside surface of neck 17. The jaws 33 and 34 can number two or more and are mounted (not shown) for movement toward each other along paths radial with respect to neck 17. The jaws 33 and 34 may be heated or they may interact with neck 17 while it is in a heat softened condition as a result of the shrinking operation. Jaws 33 and 34 move into and out of engagement with neck 17 to produce a closing of the container bottom as depicted in FIG. 4. The shell 16 is then permitted to cool so that attached moil 18 can be broken off. It is possible that some plastic materials will not break as conveniently as for example polystyrene, therefore jaws 33 and 34 can be equipped to perform a cutting operation and actually sever the moil, thus removing the necessity of removing it subsequent to cooling.

FIG. 8 shows a set of matched dies 35 and 36. Female die 35 has a groove 51 that is perpendicular to and concentric with the axis of symmetry of the molds. Groove 51 is connected to land 37 by sloping frusto-conical section 39. Land 37 is also concentric with respect to the axis of symmetry. The transition from groove 51 to land 37 is preferably gradual since cracking of the container can occur if the edges of the die are too sharp. The central section 38 of the female die 35 is relieved to an extent equal to groove 51. The central section 38 provides sufficient room for the moil stump or shear history 24. The male die 36 contains a bead forming groove 40 at its lower extent. The top section of the male die has a raised land 41 that coacts with groove 51 of female die 35. The central area 42 of male die 36 receives the bottom of the container as it is deformed by land 37 of female die 35.

In operation a preformed container shell 16 is positioned on the male die and the female die is lowered over the cup. After dies 35 and 36 have closed to their maximum extent, the container is then removed. The container then has a bead 25 and a bottom that is depressed in the center, thus providing a stable planar bottom ring 22. The bottom ring 22 permits the container to be filled with a liquid yet rest firmly on its base or bottom ring 22 without spilling the container contents.

Another important feature of the dies shown in FIG. 8 is to equalize the overall sidewall thickness of the container. Any local blistering or uneven expansion or contraction of the container sidewall is removed or diminished to such an extent that nesting of the containers can be accomplished to its fullest extent. The matched dies shown in FIG. 8 permit a container to be manufactured wherein the sidewall is of uniform thickness yet the density of the sidewall material varies in proportion to the diameter of the container. The container has a greater density near the bottom sidewall than the top sidewall since more material is in that area because of shrinkage from the original cylindrical shape.

It is to be emphasized that it has been found advantageous to place the preformed container shells 16, from which moils 18 have been removed, into dies 35 and 36 after the temperature of the container shell has returned to ambient temperature. The container 21 as shown in FIG. 5 will hold a liquid and function as a cup prior to passing through dies 35 and 36. The additional features imparted to the cup by dies 35 and 36 are the formation of a rim 25, the indenting of the bottom area 23 and creating sidewalls of uniform wall thickness.

FIG. 9 shows a stack of nested containers. The rims 25 of each container can be placed so that they are adjacent each other. The containers 21 can be removed from the stack at will without undue force being required to separate one cup from the other. The rim to rim stacking feature provided by the present invention permits more cups per given stack height, thus reducing shipping space and allowing more cups to be loaded into automatic dispensing machinery. The rim to rim stacking feature is believed to be new in containers such as drinking cups manufactured from foam plastic materials.

The method of subjecting an almost completed container to the sizing action of matched dies is an essential feature of the present invention. The treatment of the container by matched dies 35 and 36 can be considered an ironing process wherein the container sidewall is made uniform in thickness, thus permitting a closer nesting of the cups when they are stacked together.

In the prior art containers, difficulty was encountered in removing single containers from a stacked array containers. The problem was caused by an increase in container wall thickness toward the bottom of the container. The increased thickness is inherent in containers manufactured from oriented foam sheet material, because the material increases in thickness in those areas where the greatest shrinkage occurs.

Although one embodiment of the invention has been set forth in detail, it will be understood that the description thereof is intended to be illustrative, rather than restrictive, as details of the invention may be modified or changed without departing from the spirit of the invention.

What is claimed is:

1. A one-piece container manufactured from plastic foam sheet material, said container having a sidewall terminating at the top with a beaded rim and at the lower end with a closed bottom, said sidewall having at least one overlapped seam running from the rim to the bottom, said sidewall having a uniform thickness from top to bottom yet varying in density from a minimum at the top to a maximum at the bottom, said bottom constructed of two areas, the first area in the form of a concentric ring attached at its outermost extent to the bottom of the sidewall and the second area spanning the central region of the bottom of the cup and attached to said first area, said second area being nearer the top of the container than said first area, said second area containing a centrally positioned bottom closing seam that protrudes downwardly from said second area.

2. A one-piece container manufactured from oriented plastic foam sheet material, said container having a sidewall of frusto-conical configuration terminating at the larger end of the frusto-conical sidewall with beaded rim and having a closed bottom at the smaller end of the frusto-conical sidewall, sidewall having at least one overlapped seam running from the rim to the closed bottom, said sidewall having a uniform thickness that includes the top sidewall area, the bottom sidewall area and the seam area, said bottom having a first planar area and a second planar area, said areas being concentric with respect to each other, said first planar area attached to the sidewall and the second planar area spanning the central region of the bottom of the container, said second area being nearer the top of the container than said first area, said second area containing a downwardly protruding bottom closing seam positioned in the center thereof.

3. A container as claimed in claim 2 wherein the downwardly protruding bottom closing seam is positioned nearer the top of the container than the plane that contains said first planar area, whereby said bottom closing seam does not interfere with the stability of the container when it is set down.

4. A stack of nestable containers as claimed in claim 2 made of foam plastic material, said stack containing a plurality of containers telescoped one over the other, the rims of said containers in contact with each other.

* * * * *